US007743603B2

(12) United States Patent
Nishina et al.

(10) Patent No.: US 7,743,603 B2
(45) Date of Patent: Jun. 29, 2010

(54) EXHAUST GAS PURIFICATION APPARATUS

(75) Inventors: Mitsuhiro Nishina, Ageo (JP); Hideki Matsunaga, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 509 days.

(21) Appl. No.: 11/800,450

(22) Filed: May 4, 2007

(65) Prior Publication Data

US 2007/0240405 A1 Oct. 18, 2007

Related U.S. Application Data

(63) Continuation of application No. PCT/JP2005/019610, filed on Oct. 25, 2005.

(30) Foreign Application Priority Data

Nov. 5, 2004 (JP) ............................ 2004-322252

(51) Int. Cl.
*F01N 3/00* (2006.01)

(52) U.S. Cl. ............................ 60/286; 60/292; 60/295; 60/301; 60/303

(58) Field of Classification Search .................. 60/274, 60/286, 289, 292, 295, 297, 301, 303
See application file for complete search history.

(56) References Cited

U.S. PATENT DOCUMENTS

| | | | | |
|---|---|---|---|---|
| 5,605,042 | A * | 2/1997 | Stutzenberger | 60/286 |
| 6,063,350 | A | 5/2000 | Tarabulski et al. | |
| 6,119,448 | A | 9/2000 | Emmerling et al. | |
| 6,167,698 | B1 * | 1/2001 | King et al. | 60/286 |
| 6,192,677 | B1 * | 2/2001 | Tost | 60/286 |
| 6,470,673 | B1 * | 10/2002 | van Nieuwstadt et al. | 60/274 |
| 6,519,935 | B2 | 2/2003 | Weigl et al. | |
| 7,017,335 | B2 | 3/2006 | Huber et al. | |
| 7,065,958 | B2 | 6/2006 | Funk et al. | |
| 7,181,337 | B2 | 2/2007 | Kosaka | |
| 7,337,607 | B2 * | 3/2008 | Hou et al. | 60/274 |
| 2004/0045284 | A1 | 3/2004 | Ripper et al. | |
| 2007/0079599 | A1 | 4/2007 | Osaku et al. | |
| 2007/0204677 | A1 | 9/2007 | Nishina et al. | |

(Continued)

FOREIGN PATENT DOCUMENTS

| | | |
|---|---|---|
| DE | 10156714 | 6/2002 |

(Continued)

*Primary Examiner*—Binh Q. Tran
(74) *Attorney, Agent, or Firm*—McDermott Will & Emery LLP

(57) ABSTRACT

An exhaust gas purification apparatus of an engine, capable of preventing erroneous detection of an injection nozzle clogging, and having a reducing catalytic converter disposed in an exhaust system, for reducing and purifying nitrogen oxide in the exhaust gas using urea water; a urea water tank storing the urea water; a urea water supply unit sucking up the urea water from the urea water tank and mixes it with high-pressure air for delivery; and an injection nozzle injecting the urea water mixed with the high-pressure air, into an exhaust gas moving upstream side of the reducing catalytic converter in an exhaust gas passage, and further having a clogging detection unit capable of detecting clogging of the injection nozzle based on each detection output of a pressure of the air introduced into the urea water supply unit, and a temperature of the injection nozzle.

3 Claims, 3 Drawing Sheets

U.S. PATENT DOCUMENTS

| | | | |
|---|---|---|---|
| 2007/0209428 | A1 | 9/2007 | Nishina et al. |

FOREIGN PATENT DOCUMENTS

| | | | | |
|---|---|---|---|---|
| EP | 1 331 373 | A2 | | 7/2003 |
| JP | 04-282433 | | | 10/1992 |
| JP | 05-222923 | | | 8/1993 |
| JP | 09-096212 | | | 4/1997 |
| JP | 11-270329 | | | 10/1999 |
| JP | 2000-027627 | | | 1/2000 |
| JP | 2001-020724 | | | 1/2001 |
| JP | 2002-508466 | | | 3/2002 |
| JP | 2002-155732 | | | 5/2002 |
| JP | 2002-513109 | | | 5/2002 |
| JP | 2002-527660 | | | 8/2002 |
| JP | 2002-370016 | | | 12/2002 |
| JP | 2003-269145 | | | 9/2003 |
| JP | 02003269145 | A | * | 9/2003 |
| JP | 2003-328744 | | | 11/2003 |
| JP | 2004-510151 | | | 4/2004 |
| JP | 2004-517336 | | | 6/2004 |
| JP | 2004-194028 | | | 7/2004 |
| JP | 2005-030888 | | | 2/2005 |
| JP | 2005-083223 | | | 3/2005 |
| JP | 2005-127262 | | | 5/2005 |
| JP | 2005-133541 | | | 5/2005 |
| JP | 2005-133695 | | | 5/2005 |
| WO | WO 99/30810 | | | 6/1999 |
| WO | WO 99/55445 | | | 11/1999 |
| WO | WO 00/21881 | | | 4/2000 |
| WO | WO 02/27280 | | | 4/2002 |
| WO | WO 02/057603 | | | 7/2002 |
| WO | WO 03/018177 | | | 3/2003 |
| WO | WO 2005/024194 | | | 3/2005 |
| WO | WO 2005/040567 | | | 5/2005 |
| WO | WO 2005/042936 | | | 5/2005 |

* cited by examiner

EXHAUST GAS PURIFICATION APPARATUS

This application is a continuation of PCT/JP2005/019610, filed on Oct. 25, 2005.

BACKGROUND OF THE INVENTION

1. Field of the Invention

The present invention generally relates to an engine exhaust gas purification apparatus that reduces and removes nitrogen oxide (NOx) exhausted from a diesel engine, gasoline engine or the like installed in a moving vehicle, by injecting a reducing agent, which is mixed with high-pressure air, into the exhaust gas upstream side of a reducing catalytic converter through an injection nozzle. In particular, it relates to an exhaust gas purification apparatus that prevents erroneous detection of clogging by detecting clogging of the injection nozzle based on the pressure of the high-pressure air and the temperature of the injection nozzle.

2. Description of the Related Art

Several exhaust gas purification apparatuses have been proposed as system for removing harmful matter, especially NOx, from exhaust gas discharged from an engine, to purify the exhaust gas. Japanese Unexamined Patent Publication No. 2000-27627 discloses a typical exhaust gas purification apparatus for a diesel engine. In such an exhaust gas purification apparatus, a reducing catalytic converter is provided in an exhaust system of an engine, and a reducing agent, which is mixed with high-pressure air, is injection-supplied to an exhaust gas passage on the upstream side of the reducing catalytic converter to thereby create a catalytic reduction reaction between the NOx in the exhaust gas and the reducing agent in order to purify the NOx to harmless elements. The reducing agent is stored in a reducing agent tank in a liquid state at normal temperatures, and the required amount is injection-supplied from the injection nozzle. In the reduction reaction, ammonia, which has good reactivity with NOx, is used, and as the reducing agent, a urea water solution, an ammonia water solution, or other reducing agent water solution, that is hydrolyzed and produces ammonia easily, is used.

In this type of exhaust gas purification apparatus, there are situations in which the reducing agent, urea for example, is deposited during injection, and clogging the injection nozzle, so that sufficient reducing agent cannot be injection-supplied to the exhaust gas passage. To counter such a problem, an incorporation of such a system for detecting the pressure change in the high-pressure air can be considered in order to determine if the injection nozzle is clogged.

However, in the case where clogging of the injection nozzle is determined by detecting the pressure change in the high-pressure air, there is concern that the above-mentioned incorporation of the pressure detecting system may also be sensitive to detecting pressure changes in the high-pressure air produced by minute clogging, which is not a major cause of damage to the injection-supply of reducing agent, for example clogging in which deposited reducing agent will be melted easily by an increase in temperature in the injection nozzle and disappear, so that the system erroneously detects this as clogging of the injection nozzle.

SUMMARY OF THE INVENTION

Therefore, aiming to address such problems, an object of the present invention is to provide an exhaust gas purification apparatus capable of preventing erroneous detection of clogging of an injection nozzle.

In order to achieve the above object, the present invention provides an exhaust gas purification apparatus including a reducing catalytic converter disposed in an exhaust system of an engine, for reducing and purifying nitrogen oxide in the exhaust gas using a reducing agent; a reducing agent tank in which the reducing agent is stored; a reducing agent supply unit capable of sucking up reducing agent from the reducing agent tank and mixes it with high-pressure air for delivery; and an injection nozzle that injects the reducing agent which is mixed with high-pressure air, into an exhaust gas upstream side of the reducing catalytic converter in an exhaust gas passage of the exhaust system, in which there is provided a clogging detection unit configured to detect clogging of the injection nozzle based on each detection output of a pressure of the high-pressure air introduced into the reducing agent supply unit, and a temperature of the injection nozzle.

In such a configuration, clogging of the injection nozzle is detected by the clogging detection unit based on both the pressure of the high-pressure air introduced into the reducing agent supply unit, which sucks up the reducing agent from the reducing agent tank, and mixes it with the high-pressure air for delivery, and the temperature of the injection nozzle, which injects the reducing agent into the exhaust gas moving upstream side of the reducing catalytic converter in the exhaust gas passage.

Furthermore, the clogging detection unit is provided with: a first comparator that compares a pressure of the high-pressure air introduced into the reducing agent supply unit with a predetermined threshold value; a second comparator that compares a temperature of the injection nozzle with a predetermined threshold value; a logic circuit that performs a logical AND operation on outputs of each of the comparators; and a determination section configured to determine clogging of the injection nozzle based on an output of the logic circuit when the pressure of the high-pressure air and the temperature of the injection nozzle both exceed the threshold values, to output a signal indicating an occurrence of clogging. In this manner, the pressure of the high-pressure air introduced into the reducing agent supply unit is compared with the predetermined threshold value by the first comparator, the temperature of the injection nozzle is compared with the predetermined threshold value by the second comparator, the logical AND operation of the outputs from the first and second comparators is performed by the logic circuit, clogging of the injection nozzle is determined based on the output from the logic circuit when the pressure of the high-pressure air and the temperature of the injection nozzle both exceed each threshold value, in the determination section, so that a signal indicating an occurrence of clogging is outputted.

Moreover, the high-pressure air introduced into the reducing agent supply unit is adjusted such that the flow rate is constant. In this manner, high-pressure air whose flow rate is adjusted such that it is constant, is introduced into the reducing agent supply unit.

Furthermore, the threshold value of the second comparator is greater than or equal to the fusing point of the reducing agent. Therefore, the temperature of the injection nozzle is compared by the second comparator with a temperature greater than or equal to a fusing point of the reducing agent, as the threshold value.

According to the present invention, based on both the pressure of high-pressure air introduced into the reducing agent supply unit which sucks up the reducing agent from the reducing agent tank, and mixes it with high-pressure air for delivery, and the temperature of the injection nozzle that injection-supplies the reducing agent to the exhaust gas moving upstream side of the reducing catalytic converter in the exhaust gas passage, clogging of the injection nozzle is detected by the clogging detection unit, and hence it is possible to prevent erroneous detection of clogging of the injection nozzle.

Furthermore, according to a preferred embodiment of the present invention, the pressure of the high-pressure air introduced to the reducing agent supply device is compared with the predetermined threshold value by the first comparator, the temperature of the injection nozzle is compared with the predetermined threshold value by the second comparator, the logical AND of the outputs from the first and second comparators is performed by the logic circuit clogging of the injection nozzle is determined by the determination section based on the outputs from the logic circuit when the pressure of the high-pressure air and the temperature of the injection nozzle both exceed each threshold values, and a signal indicating the occurrence of clogging is outputted, and hence it is possible to determine clogging of the injection nozzle easily.

Moreover, according to a further embodiment of the present invention, high-pressure air whose flow rate is adjusted to be constant, is introduced into the reducing agent supply device, and hence it is possible to detect clogging of the injection nozzle by a change in the pressure of the high-pressure air introduced into the reducing agent supply unit.

According to a still further embodiment of the present invention, the threshold value of the second comparator is set greater than or equal to the fusing point of the reducing agent, and hence combined with the output from the first comparator it is possible to detect major clogging of the injection nozzle in which deposited reducing agent does not melt in spite of the temperature of the injection nozzle being greater than the fusing point of the reducing agent, or clogging of the injection nozzle due to a foreign substance. Accordingly, minute clogging in which deposited reducing agent melts easily and disappears in the case where the temperature of the injection nozzle increases above the fusing point of the reducing agent, is excluded from the determination of clogging of the injection nozzle, so that it is possible to detect selectively only major dogging that adversely affects the injection-supply of the reducing agent

DESCRIPTION OF THE PREFERRED EMBODIMENTS

Hereunder is a detailed description of a preferred embodiment of the present invention, based on the accompanying drawings.

Figure 1:
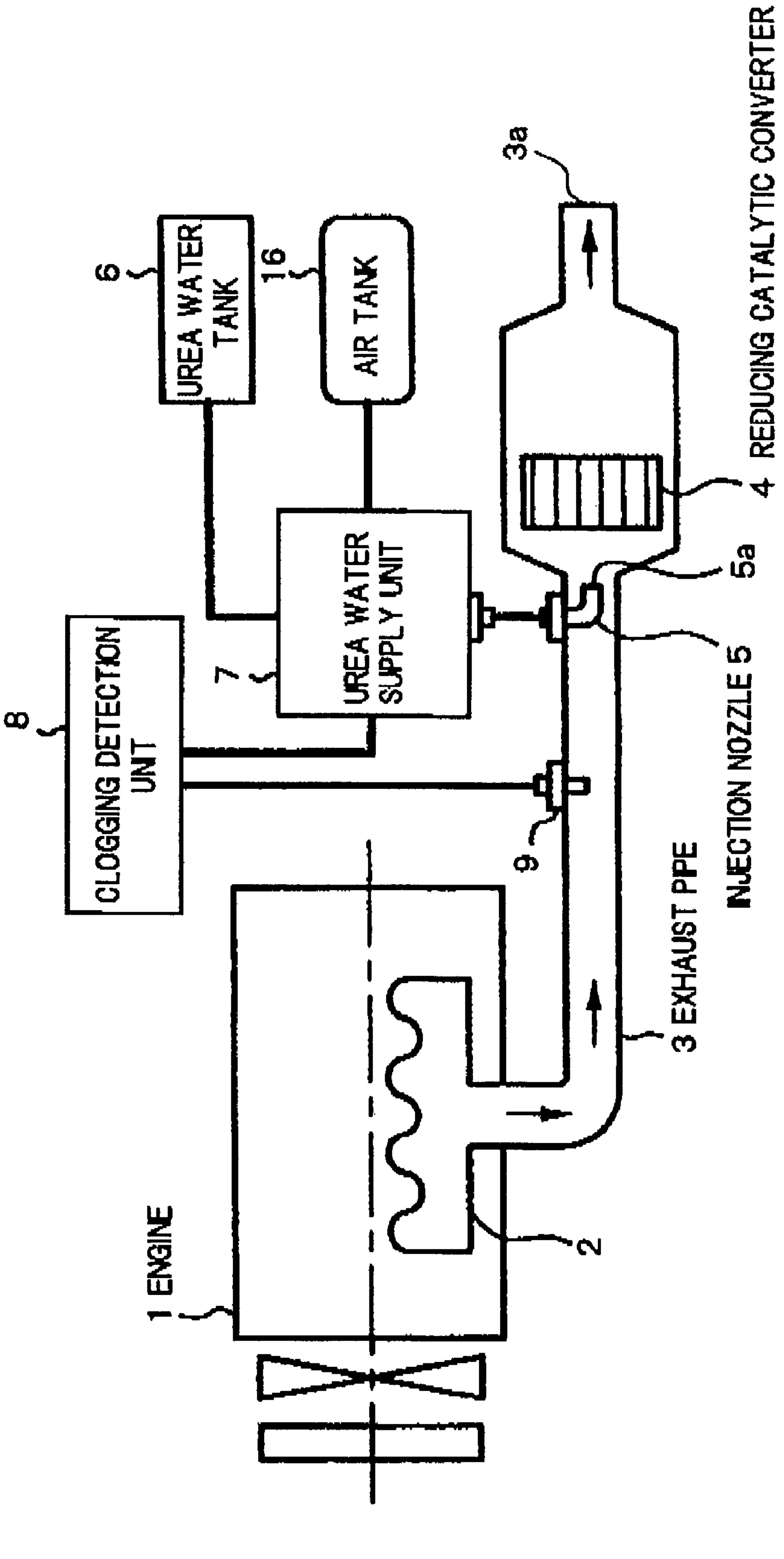
FIG. 1 is a conceptual and diagrammatic view showing an embodiment of an exhaust gas purification apparatus according to the present invention.

Referring to FIG. 1, which is a conceptual and diagrammatic view of an exhaust gas purification apparatus according to a preferred embodiment of the present invention, the exhaust gas purification apparatus is provided for reducing and removing NOx exhausted from a diesel engine, a gasoline engine, or the like installed in a moving vehicle, using a reducing agent. The exhaust gas purification apparatus is provided with a NOx reducing catalytic converter 4 and an injection nozzle 5 in an exhaust pipe 3, being an exhaust gas passage which exhausts exhaust gas from an engine 1 whose fuel is gasoline or light oil to the atmosphere through an exhaust manifold 2, is provided with a urea water tank 6 connected to the injection nozzle 5 via a urea water supply device 7, and is provided with a clogging detection device 8 which is connected to the injection nozzle 5 via the urea water supply device 7, and detects dogging of the injection nozzle 5.

The NOx reducing catalytic converter 4 is installed close to the exhaust outlet 3*a* of the exhaust pipe 3. The NOx reducing catalytic converter 4 reduces and purifies NOx in the exhaust gas passing through the exhaust pipe, using the reducing agent. For example, it may be a zeolitic active ingredient supported by a monolith type catalyst carrier made from ceramic cordierite or a Fe—Cr—Al system heat-resistant steel, which has a honeycomb shape cross-section. The active ingredient supported by the catalyst carrier receives the supply of the reducing agent, and is activated to effectively purify NOx in the exhaust gas into harmless substances.

The injection nozzle 5 is provided on upstream side of the reducing catalytic converter 4 in an exhaust gas passage defined in the exhaust pipe 3. The injection nozzle 5 injects urea water, for example, as the reducing agent, supplied from the urea water tank 6 described later, into the exhaust gas moving upstream side of the reducing catalytic converter 4 in the exhaust pipe 3. It is arranged such that a nozzle tip 5*a* is arranged to be directed, by e.g., bending, toward the exhaust gas downstream side in order to injection-supply the urea water toward the reducing catalytic converter 4. Furthermore, a temperature sensor 9 that detects the temperature of the injection nozzle 5 is provided on an upstream side of the injection nozzle 5 in the exhaust gas passage of the exhaust pipe 3.

Figure 2:
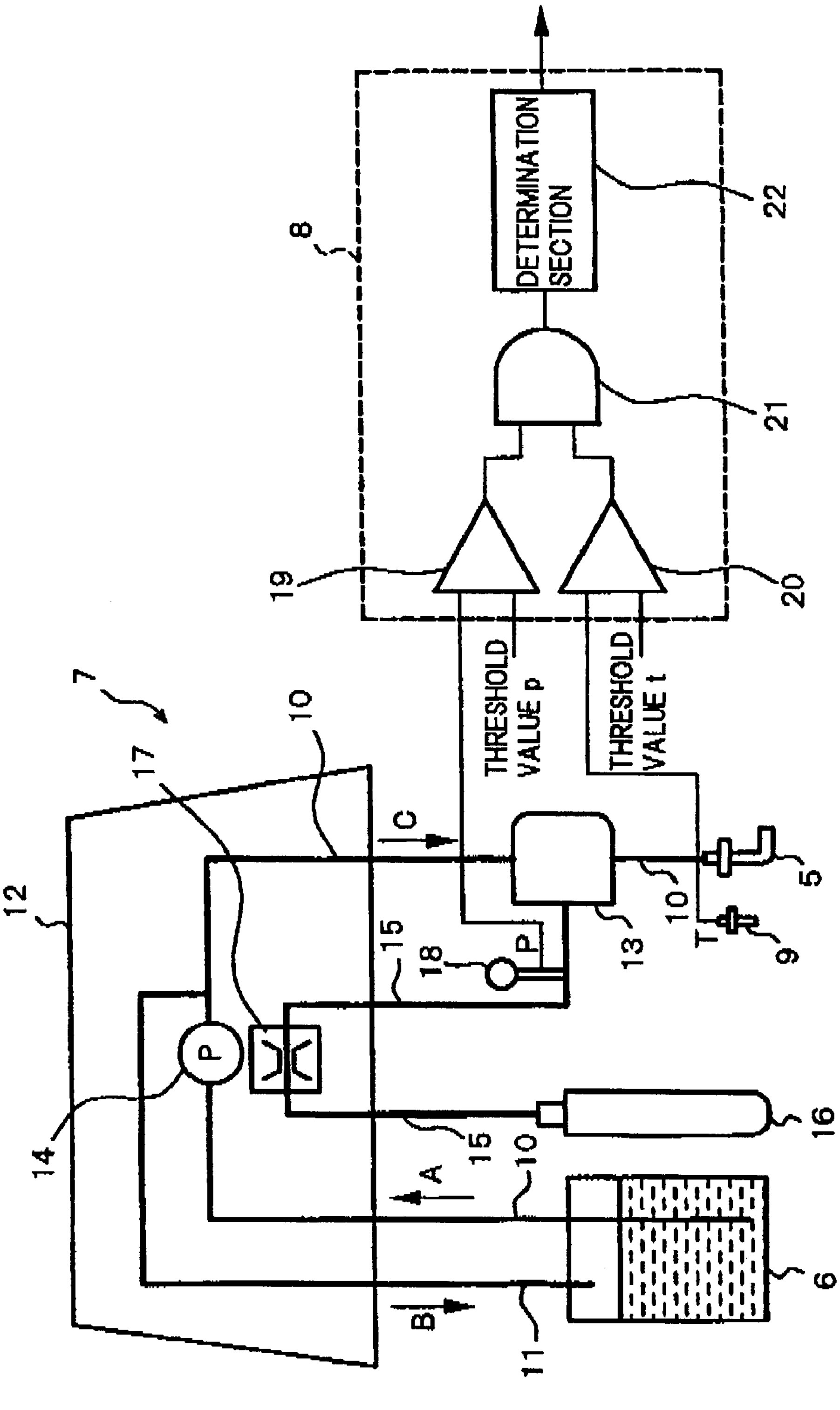
FIG. 2 is an explanatory schematic view showing the configuration of the main parts of the exhaust gas purification apparatus; and, FIG. 3 is a flow chart for explaining the operation of a clogging detection unit of the above-mentioned exhaust gas purification apparatus.

The urea water tank 6 is connected to the injection nozzle 5 via a urea water supply pipe 10 (see FIG. 2). The urea water tank 6 serves as a reducing agent tank that stores urea water.

The urea water supply device 7 is provided part way along the urea water supply pipe 10, between the injection nozzle 5 and the urea water tank 6. The urea water supply device 7 serves as a reducing agent supply unit, which sucks up urea water from the urea water tank 6, and mixes it with high-pressure air for delivery to the injection nozzle 5. As shown in FIG. 2, The exhaust gas purification apparatus is provided with: a pump section 12, which is able to suck up urea water in the direction of arrow A via the urea water supply pipe 10 connected to the urea water tank 6, and returns part of the excess sucked up urea water to the urea water tank 6 in the direction of arrow B via a urea water return pipe 11 connected to the urea water tank 6; and a mixing section 13 part way along the urea supply pipe 10 that connects the pump section 12 and the injection nozzle 5, that mixes the urea water supplied through the urea water supply pipe 10 in the direction of arrow C, with high-pressure air, and delivers this to the injection nozzle 5.

Here the pump section 12 is provided with a pump 14, which is able to suck up urea water from the urea water tank 6 and delivers it to the mixing section 13 under pressure, and an air tank 16 that supplies high-pressure air to the mixing section via an air pipe 15. It is arranged such that the flow rate of the high-pressure air introduced into the mixing section 13 is adjusted such that it is constant by an aperture, for example an orifice 17, provided part way along the air pipe 15, Moreover, a pressure sensor 18 that detects the pressure of the high-pressure air whose flow rate has been adjusted so that it is constant, is provided in the air pipe 15 between the orifice 17 and the mixing section 13. The high-pressure air flows continuously while the pressure is detected.

As shown in FIG. 1, the clogging detection unit 8 is connected to the temperature sensor 9 which detects the temperature of the injection nozzle 5, and the urea water supply unit 7. The clogging detection unit 8 detects clogging of the injection nozzle 5, and as shown in FIG. 2, is provided with a first comparator 19 connected to the pressure sensor 18 of the air pipe 15, is provided with a second comparator 20 connected to the temperature sensor 9 of the injection nozzle 5, and is provided with a logic circuit 21 connected to the outputs of each of the first and second comparators 19 and 20. Furthermore, it is provided with a determination section 22 connected to the logic circuit 21.

The first comparator 19 compares the pressure "P" of the high-pressure air introduced into the mixing section 13 and detected by the pressure sensor 18, with a predetermined threshold value "p". When P>p is satisfied, for example "1" is outputted, and when P≦p is satisfied, for example "0" is outputted.

Furthermore, the second comparator 20 compares the temperature T of the injection nozzle 5 detected by the temperature sensor 9, with a predetermined threshold value "t" which is, for example, greater than or equal to the urea fusing point (approximately 132° C.), and set appropriately to 135° C. for example. When T≧t is satisfied, for example "1" is outputted, and when T<t is satisfied, for example "0" is outputted.

Moreover, the logic circuit 21 performs a logical AND operation on the outputs from the first and second comparators 19 and 20. When the outputs from the comparators are both "1", the logic circuit outputs "1", and when the outputs from the comparators are both "0" or either one of them is "1", the logic circuit outputs "0".

Furthermore, the determination section 22, which may be a CPU for example, determines if the injection nozzle 5 is clogged based on the output from the logic circuit 21, and when the output from the logic circuit 21 is "1", the determination section outputs a signal indicating the occurrence of dogging of the injection nozzle 5.

Figure 3:
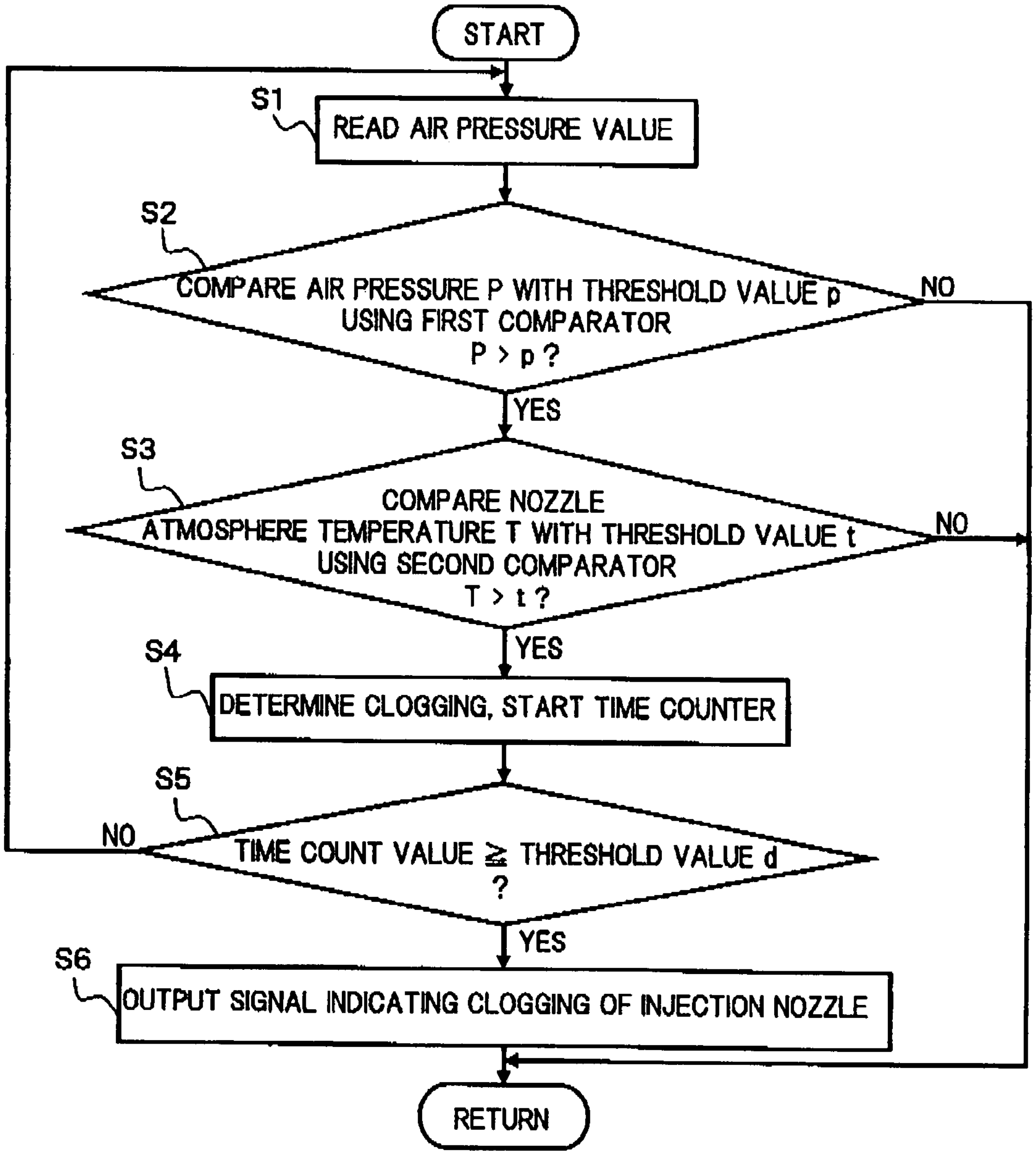

Next is a description of the operation of the clogging detection unit 8 of the exhaust gas purification apparatus constructed as above, with reference to the flow chart of FIG. 3.

Firstly, in step S1, the clogging detection unit 8 reads the value of the pressure "P" of the high pressure air introduced into the mixing section 13, which is detected and outputted by the pressure sensor 18.

In step S2, the first comparator 19 inputs therein a signal indicating the pressure "P" of the high-pressure air introduced into the mixing section 13, which is detected and outputted by the pressure sensor 18, and compares the inputted signal with the predetermined threshold value "p" set in advance. Here, if P>p, clogging has occurred in the injection nozzle 5 due to deposits of urea or the like, adversely affecting the flow of the high-pressure air and increasing the pressure, so an output indicating the clogging of the injection nozzle 5, for example "1" is outputted. At this stage, similarly to the conventional technique, the clogging of the injection nozzle 5 detected in this case includes minute clogging in which the deposited reducing agent will be melted easily by the increase in the temperature of the injection nozzle 5 and disappear. In this case, the determination is "YES", and control proceeds to step S3.

On the other hand, in step S2, in the case of P≦p, it indicates that there is no clogging in the injection nozzle 5, and the high-pressure air flows normally. At this time, the first comparator 19 outputs an output indicating that there is no clogging, for example "0". Furthermore, at this time, the determination is "NO", and the processes of steps S1 and S2 are repeated.

In step S3, the second comparator 20 inputs therein a signal indicating the temperature "T" of the injection nozzle 5 which is detected and outputted by the temperature sensor 9 disposed on the upstream side of the injection nozzle 5 of the exhaust gas passage in the exhaust pipe 3, and compares the inputted signal with the predetermined threshold value "t" set in advance, which is for example greater than or equal to the urea fusing point (approximately 132° C.), and set appropriately to 135° C. for example. Here if T≧t, it indicates a possibility that urea deposited in the injection nozzle 5 will melt and disappear due to the heat in the injection nozzle 5, so an output indicating that the deposited urea is in a state whereby it is capable of melting, for example "1" is outputted. In this case, the determination is "YES", and control proceeds to step S4.

On the other hand, in step S3, if T<t, it indicates a state for example before the engine starts or immediately after the engine starts, in which the injection nozzle 5 has not heated up. At this time, the second comparator 20 outputs an output indicating that the deposited urea is not in a state whereby it is capable of melting, for example "0". Further, at this time, the determination is "NO", and the processes of steps S1 to S3 are repeated.

In step S4, the logic circuit 21 performs a logical AND operation on the outputs from the first comparator 19 and the second comparator 20. In this case, under the conditions where both that the air pressure "P" is greater than the threshold value "p" (the output from the first comparator 19 is "1") and that the temperature T of the injection nozzle 5 is greater than or equal to the threshold value t (=135° C.) (the output from the second comparator 20 is "1"), the logic circuit 21 outputs "1", and under conditions other than the above, the logic circuit outputs "0".

Here, based on the output of the logic circuit 21, the determination section 22 determines if the injection nozzle 5 is clogged. In this case, when the output from the logic circuit 21 is "1", that is when both P>p and T≧t are satisfied, it indicates that although the condition is such that the urea deposited in the injection nozzle 5 might melt and disappear, clogging has occurred in the injection nozzle 5. That is, the clogging of the injection nozzle 5 in this case is determined to be either a major clogging in which the deposited urea is not melted easily, or clogging caused by foreign matter that cannot be removed, so a timer device, which is omitted in the figure, starts to count the time.

In step S5, the determination section 22 determines whether or not the count value of the time is greater than or equal to a threshold value "d" set in advance. If the determination is "YES", control proceeds to step S6. On the other hand, if the determination is "NO", control returns step S1, and processes of steps S1 to S5 is repeated.

In step S8, since the clogging of the injection nozzle 5 has not been cancelled after a predetermined time has elapsed, the determination section 22 outputs a signal indicating that the injection nozzle 5 is clogged.

In the above embodiment, the case is described in which the temperature sensor 9 is disposed on the upstream side of the injection nozzle 5 in the exhaust gas passage. However, it is not limited to this, and the sensor 9 may be disposed on the side face of the injection nozzle 5, or in the vicinity of the injection nozzle 5.

Furthermore, the case is described in which urea water is used as a reducing agent. However, it is not limited to this, and other reducing agents that are suitable for purifying exhaust gas, for example an ammonia water solution, may be used.

It should be appreciated that the entire contents of Japanese Patent Application No. 2004-322252, filed on Nov. 5, 2004, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An exhaust gas purification apparatus including: a reducing catalytic converter disposed in an exhaust system of an engine, for reducing and purifying nitrogen oxide in the exhaust gas using a reducing agent; a reducing agent tank in which the reducing agent is stored; a reducing agent supply unit, which sucks up reducing agent from the reducing agent tank and mixes it with high pressure air for delivery; and an injection nozzle capable of injecting the reducing agent which is mixed with high pressure air, into an exhaust gas moving upstream side of the reducing catalytic converter in an exhaust gas passage of the exhaust system, wherein the apparatus comprises a clogging detection unit configured to detect clogging of the injection nozzle based on each detection output of a pressure of the high-pressure air introduced into the reducing agent supply unit, and a temperature of the injection nozzle, wherein the clogging detection unit comprises:

a first comparator configured to compare a pressure of the high pressure air introduced into the reducing agent supply unit with a predetermined threshold value;

a second comparator configured to compare a temperature of the injection nozzle with a predetermined threshold value;

a logic circuit capable of performing a logical AND operation on outputs from each of the comparators; and a determination section that determines clogging of the injection nozzle based on an output from the logic circuit when the pressure of the high-pressure air and the temperature of the injection nozzle both exceed the threshold values, respectively, and outputs a signal indicating an occurrence of clogging.

2. The exhaust gas purification apparatus according to claim 1, wherein the high-pressure air introduced into the reducing agent supply device is adjusted such that a flow rate thereof is constant.

3. The exhaust gas purification apparatus according to claim 1, wherein the threshold value of the second comparator is greater than or equal to a fusing point of the reducing agent.

* * * * *